(12) United States Patent
Rohr et al.

(10) Patent No.: US 6,170,521 B1
(45) Date of Patent: Jan. 9, 2001

(54) SHUT-OFF DEVICE FOR CONVEYOR CONDUITS

(75) Inventors: Marcel O. Rohr, Hunzenschwil (CH); Peter Mueller, Kriftel (DE)

(73) Assignee: Colortronic GmbH, Friedrichsdorf (DE)

( * ) Notice: Under 35 U.S.C. 154(b), the term of this patent shall be extended for 0 days.

(21) Appl. No.: 09/232,474

(22) Filed: Jan. 15, 1999

(30) Foreign Application Priority Data

Jan. 28, 1998 (DE) .............................................. 198 02 986

(51) Int. Cl.[7] ........................................................ F17D 1/00
(52) U.S. Cl. .......................... 137/613; 251/212; 251/329
(58) Field of Search .................................. 251/212, 329; 137/613

(56) References Cited

U.S. PATENT DOCUMENTS

| | | | |
|---|---|---|---|
| 4,182,359 | * | 1/1980 | Rickard ............................ 137/246.22 |
| 4,193,574 | * | 3/1980 | Barnes et al. ......................... 251/1.3 |
| 4,253,487 | * | 3/1981 | Worley et al. ........................ 137/375 |
| 4,269,166 | * | 5/1981 | Worley et al. ..................... 126/285 R |
| 4,300,749 | * | 11/1981 | Ferro et al. ........................... 251/124 |
| 4,531,539 | * | 7/1985 | Jandrasi et al. ...................... 137/375 |
| 4,658,857 | * | 4/1987 | Ayres, Jr. ............................. 137/601 |
| 4,957,139 | * | 9/1990 | Gwin et al. ........................... 137/556 |
| 5,160,119 | * | 11/1992 | Lemire et al. ........................ 251/212 |
| 5,168,900 | * | 12/1992 | Johnson ............................. 137/637.3 |
| 5,199,685 | * | 4/1993 | Larseneur ............................ 251/212 |
| 5,241,989 | * | 9/1993 | Kalavitis ............................. 137/613 |
| 5,323,804 | * | 6/1994 | Lin ...................................... 137/362 |

\* cited by examiner

*Primary Examiner*—A. Michael Chambers
*Assistant Examiner*—Thomas L. McShane
(74) *Attorney, Agent, or Firm*—W. F. Fasse; W. G. Fasse

(57) ABSTRACT

A shut-off device for selectively stopping the flow of conveyed loose bulk materials in a conveyor conduit includes a housing (2) with a flow passage (3) therethrough, and at least one shut-off element (4, 5) movably arranged in the housing. The at least one shut-off element (4, 5) is driven by at least one drive (7, 8) and is arranged in such a manner that it moves between a first open position in which the flow passage (3) is completely open, and a second nearly closed position in which the flow passage (3) is nearly but not completely closed. Namely, a flow gap (6) preferably having a dimension on the order of the particle size of the goods to be conveyed, remains open even when the shut-off element (4, 5) is in its most-closed position. Particles of the conveyed material become caught on or in the gap (6) to effectively close off and stop the flow of conveyed materials. Avoiding the complete closure of the flow passage (3) prevents particles of the conveyed material from interfering with the closing operation or become pinched by the closing shut-off element, and the required closing force is reduced. Such a shut-off device can be arranged in series with a second shut-off device that completely closes the flow passage in an airtight sealed manner, whereby this second shut-off device does not have to separate or pinch off the flow of solid material particles.

22 Claims, 6 Drawing Sheets

SHUT-OFF DEVICE FOR CONVEYOR CONDUITS

PRIORITY CLAIM

This application is based on and claims the priority under 35 U.S.C. §119 of German Patent Application 198 02 986.1, filed on Jan. 28, 1998, the entire disclosure of which is incorporated herein by reference.

FIELD OF THE INVENTION

The invention relates to a shut-off device for pipelines and hoselines, generally called conduits herein, whereby the shut-off device includes a housing with a flow passage therethrough and at least one shut-off element arranged in the housing.

BACKGROUND INFORMATION

Shut-off devices of the above mentioned general type are used to control the flow of a conveying fluid, such as air, another gas, or a liquid, and a loose bulk material being conveyed by the conveying fluid in a hoseline or a pipeline or some other type of conduit, for example in a pneumatic conveyor system. In other words, such shut-off devices serve to open and close the conveyor conduit in a controlled manner. Generally, such shut-off devices are used in pneumatic conveyor conduits that convey plastic granulates and the like to various processing machines, whereby for example, a respective shut-off device is opened in order to fill a supply hopper or the like with the loose bulk plastic granulate, and is then closed once the required amount of material has been conveyed.

The conveyed material is generally not absolutely homogeneous in terms of particle size and the nature or quality thereof. Such inhomogeneity applies especially, but not exclusively, to recycled materials. The particulate nature of the conveyed materials, and the inherent inhomogeneity of the particle size and shape and other parameters of the material, lead to problems in the operation of the shut-off devices. For example, when the shut-off device is to be closed, not only the conveying air-stream, but also the flow of conveyed material itself must be blocked or shut off. As a result of the bulky materials becoming caught or hung-up as the shut-off element of the shut-off device is closing, it often becomes necessary to apply a considerable closing force to the shut-off element, especially when particles of the conveyed material must be pinched off by the shut-off element.

SUMMARY OF THE INVENTION

In view of the above, it is an object of the invention to provide a shut-off device that can be reliably and consistently closed to block a conveyed stream of bulk material, while requiring only a relatively low application of closing force compared to the prior art, even when otherwise problematic bulk goods are being conveyed. Another object of the invention is to provide a closing element arrangement that does not cause pinching-off of particles of the conveyed goods. The invention further aims to avoid or overcome the other disadvantages of the prior art, and to achieve additional advantages, as apparent from the present description.

The above objects have been achieved in a shut-off device according to the invention, including a housing having a flow passage therethrough, and at least one shut-off element arranged in the housing so as to be movable between a first position in which the flow passage is substantially open to allow a flow therethrough, and a second position in which the shut-off element partially, but not completely closes the flow passage. The flow passage being "substantially open" in the first position means that the shut-off device has its nominal maximum flow cross-sectional area in the first position. On the other hand, the shut-off element is configured and/or arranged and/or movable in such a manner that when it is in its most-closed position, i.e. the second position, it does not completely close the flow passage. More particularly, the shut-off device is so embodied that a complete closure or blocking of the flow passage by the shut-off element is positively prevented.

According to the invention, the flow passage remains slightly open even when the shut-off element is in its most-closed position, whereby a flow gap remains through the flow passage in the area of the edge of the shut-off element, for example. The width of this flow gap is preferably on the same order of magnitude and more preferably within the range of one-half to one and one-half times the average particle size of the bulk material being conveyed. With this arrangement, the particles of the loose bulk material become caught or hung-up on the edges of the gap or within the gap and thereby serve to close the gap and complete the closure of the shut-off device, Alternatively, the remaining open gap width can be specified as being in the range from 0.5 mm to 40 mm for many applications, or as providing a remaining gap area of 1% to 7% of the nominal maximum open flow cross-section area of the flow passage. In the above manner it is achieved that the forces needed for closing the inventive shut-off element are significantly less than the forces needed for closing prior art shut-off devices, namely shut-off devices in which the shut-off element is completely closed and thereby has to pinch-off and separate the stream or even the individual particles of the conveyed bulk material.

According to a further embodiment of the invention, at least two shut-off devices are arranged in series one after the other in the conveying direction to form a shut-off system or shut-off arrangement. Preferably, the two shut-off devices are arranged vertically one above the other. In this shut-off arrangement, the conveyed stream of bulk material can first be interrupted or shut-off by the first shut-off device, and then the second shut-off device provides the complete airtight closure of the conveyor conduit line. Namely, the first shut-off device in this arrangement is preferably a shut-off device according to the invention in which the shut-off element does not completely close the flow passage, even in its most-closed position, while the second shutoff device may be any type of shut-off device that completely closes or seals the flow passage therethrough. This arrangement allows the conveying flow to be completely shut-off using relatively small shut-off elements driven by correspondingly small drive mechanisms that apply a relatively small closing force, in comparison to prior art arrangements.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
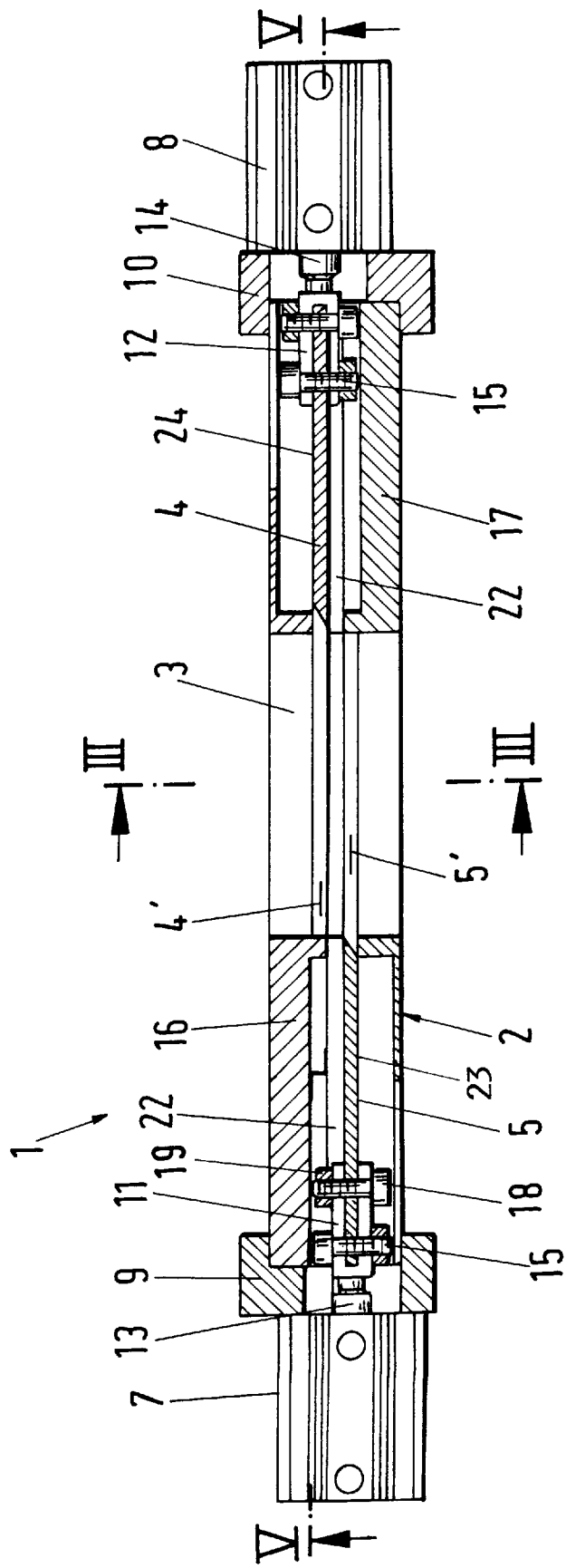
FIG. 1 is a sectional view of a shut-off device according to an embodiment of the invention, in the "open" operating position.
Figure 2:
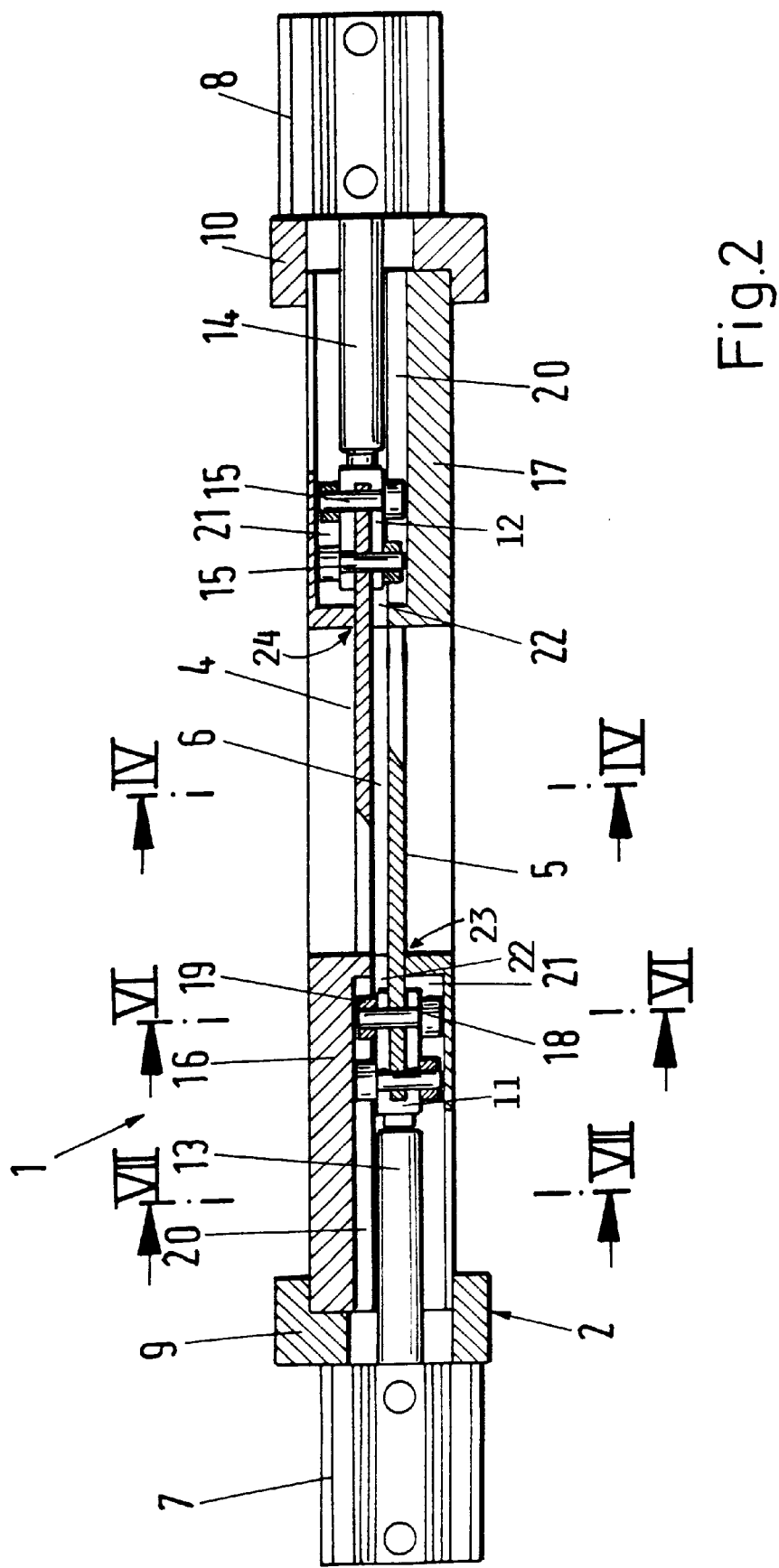
FIG. 2 is a sectional view corresponding to that of FIG. 1, but showing the shut-off device in the "closed" operating position.

As shown in FIGS. 1 and 2, a shut-off device 1 according to the invention includes a housing 2 with a flow passage 3 passing therethrough, as well as two flat plate-shaped shut-off blades or shut-off elements 4 and 5 arranged in the housing 2 so as to selectively open or partially close the flow passage 3. FIG. 1 shows the condition in which the shut-off elements 4 and 5 are completely retracted so that the flow passage 3 is substantially completely open, while FIG. 2 shows the condition in which the shut-off elements 4 and 5 have been maximally extended so as to mostly, but not entirely, close the flow passage 3. Namely, in the maximum or most-closed position of the shut-off elements 4 and 5 as shown in FIG. 2, the flow passage 3 is not completely closed and sealed in an airtight manner, but rather a space or gap 6 remains between the two shut-off elements 4 and 5, and allows a minimum flow of the conveying fluid, such as air or the like, therethrough, while blocking the particulate conveyed material as will be described next.

In order to be able to form the gap 6 between the shut-off elements 4 and 5, the shut-off elements 4 and 5 are respectively arranged on and slidable along parallel planes 4' and 5' that are spaced apart from one another by a small distance that ultimately represents the gap 6. In the most-closed position, the two shut-off elements 4 and 5 overlap one another to a degree or overlapping length that may be variably selected depending on the particular application. The overlap is not a contacting overlap, however, so that the gap 6 is formed between the two shut-off elements 4 and 5 in the overlapping area and extends along the shut-off elements 4 and 5 in their direction of sliding motion. The width of the gap 6, and therewith the spacing between the two shut-off elements 4 and 5, preferably substantially corresponds to the particle dimensions of the loose bulk material that is to be conveyed. For this reason, particles of the conveyed material become caught or hung-up in or on or immediately in front of the gap 6, i.e. either between the overlapping portions of the shut-off elements 4 and 5, or between the free edge of the shut-off element 5 and the adjoining area of the shut-off element 4. Due to this accumulation of particles of the conveyed material, the gap 6 is effectively closed so as to prevent further passage of the conveyed material therethrough.

The shut-off device 1 further includes drives 7 and 8 respectively connected to the shut-off elements 5 and 4 for selectively opening and closing the shut-off elements relative to the flow passage 3. As shown, the drives 7 and 8 are preferably linear drives, such as hydraulic, pneumatic, or electromechanical piston devices respectively having piston rods 13 and 14 that are connected respectively in line with the two shut-off elements 5 and 4, by means of connector forks 11 and 12 that are provided on respective free ends of the piston rods 13 and 14 and that are connected by screws or bolts 15 to the respective shut-off elements 5 and 4. Accordingly, the two drives 7 and 8 are not arranged in line or on a common plane with each other, but slightly offset laterally from each other by a distance corresponding to the spacing distance between the two planes 4' and 5' of the shut-off elements 4 and 5.

The housing 2 includes two U-section end members 9 and 10, to which the two drives 7 and 8 are respectively rigidly connected. The housing 2 further includes plate-shaped wall members 16 and 17, of which the narrow edges are grasped and held between the U-section end members 9 and 10. The flow passage 3 is provided as a hole through the side wall members 16 and 17 of the housing 2. The heads 18 of the screws or bolts 15 as well as glider blocks 19 acting as nuts on the screws or bolts 15 serve to guide the sliding motion of the shut-off elements 4 and 5 in guide grooves 20 and 21 formed in the inner surfaces of the side wall members 16 and 17, as shown in FIGS. 1, 2, 6 and 7.

Figure 3:
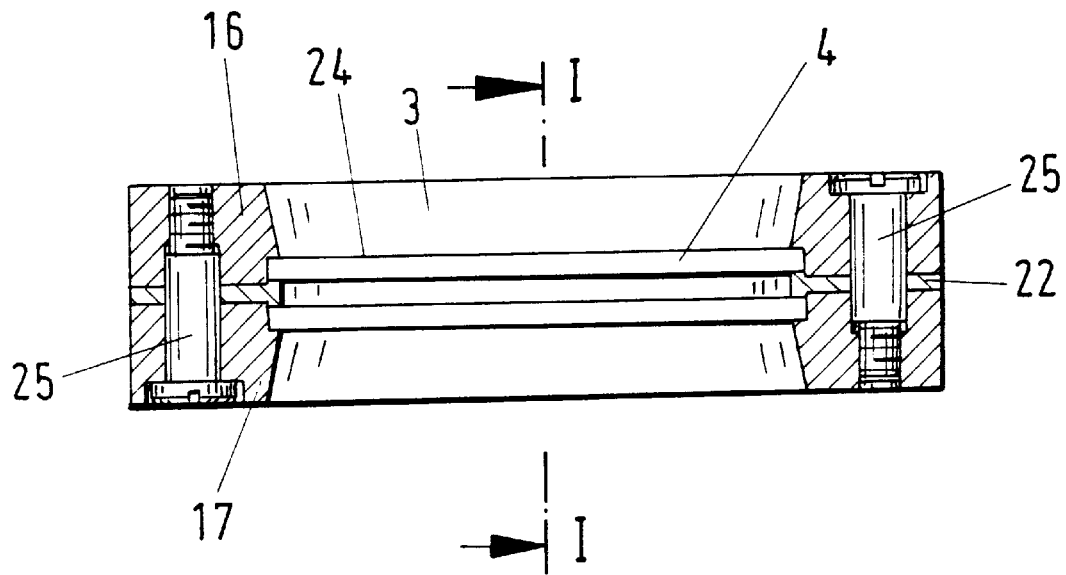
FIG. 3 is a sectional view of the shut-off device taken along the section line III—III in FIG. 1.
Figure 4:
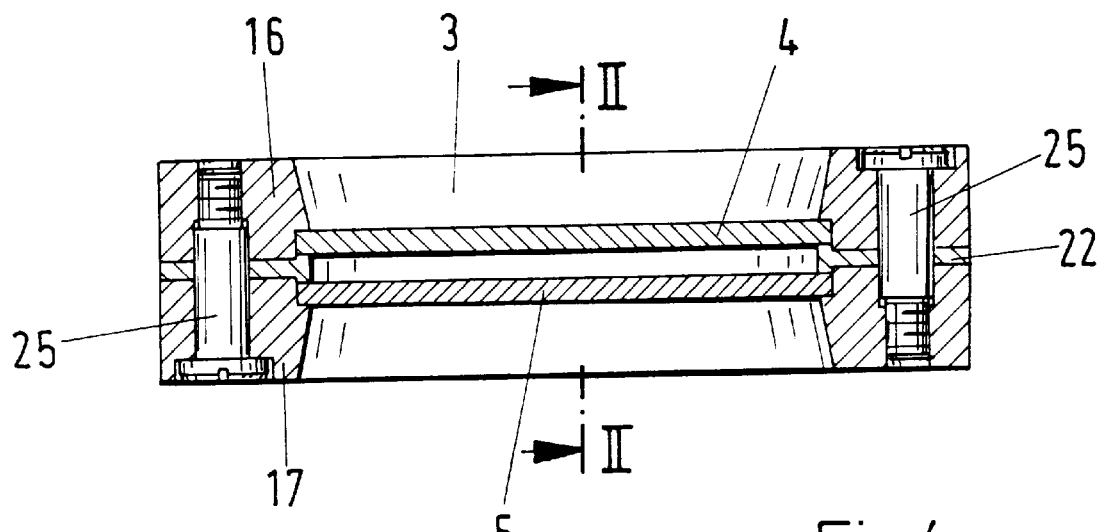
FIG. 4 is a sectional view of the shut-off device taken along the section line IV—IV in FIG. 2.
Figure 5:
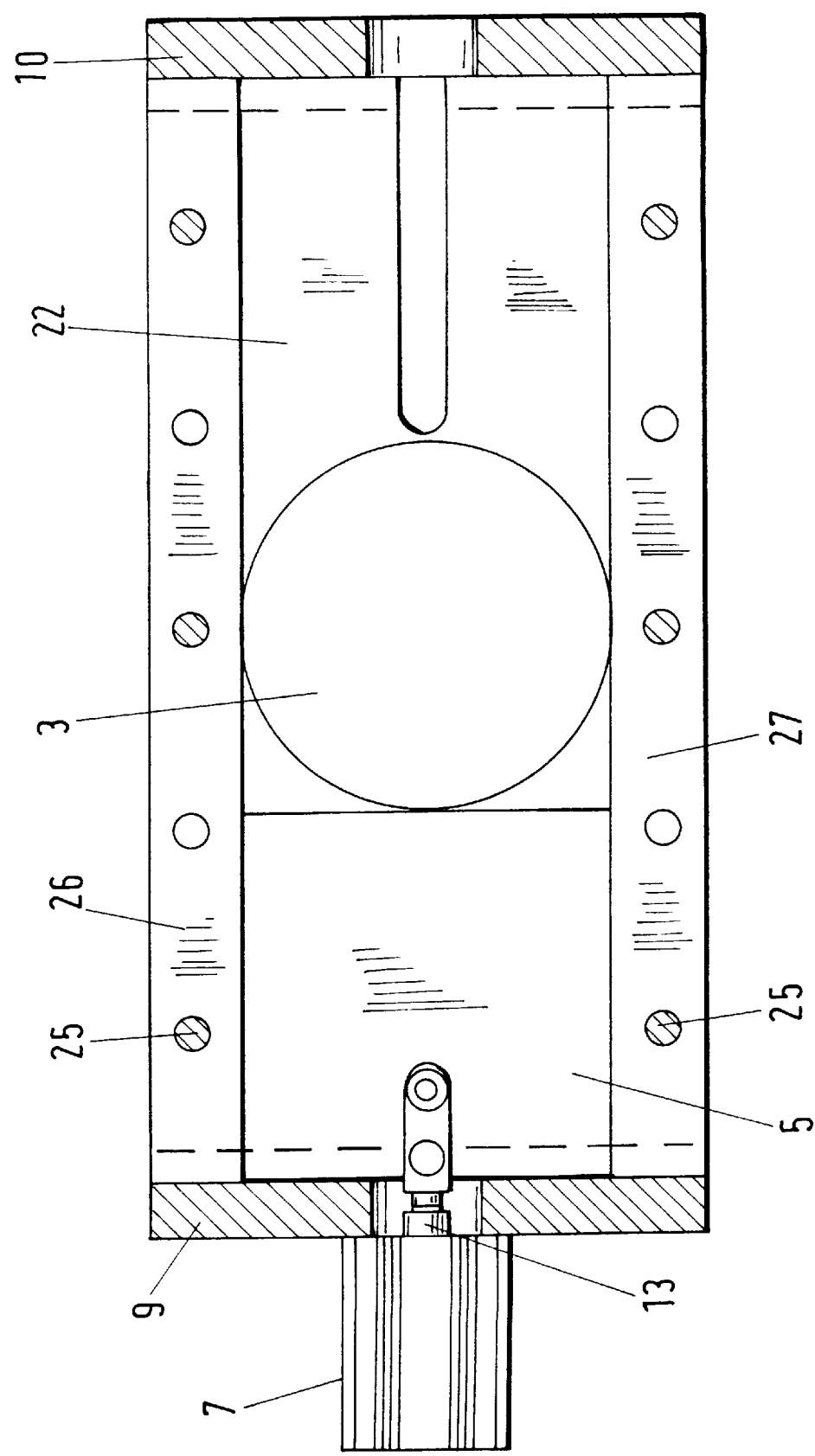
FIG. 5 is a sectional view of the shut-off device taken along the section line V—V in FIG. 1, showing only one shut-off element with one associated drive.
Figure 6:
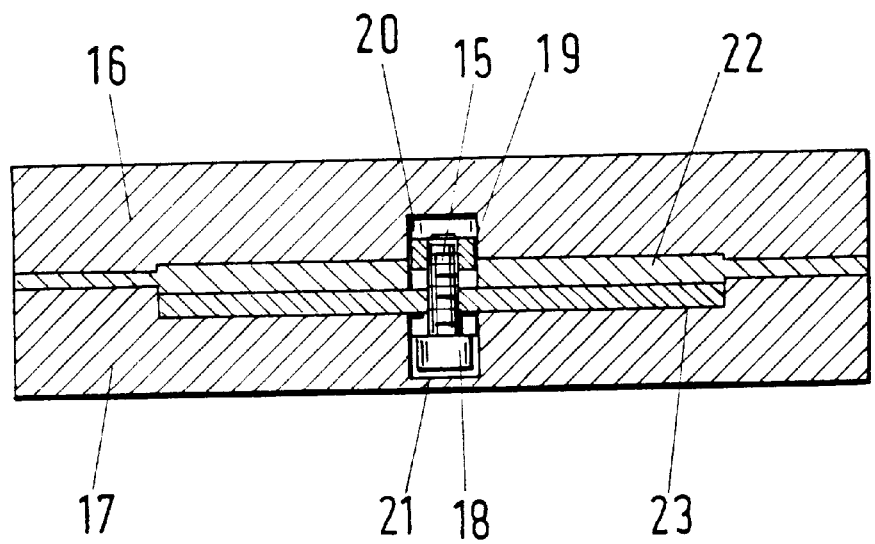
FIG. 6 is a sectional view taken along the line VI—VI in FIG. 2, on an enlarged scale.
Figure 7:
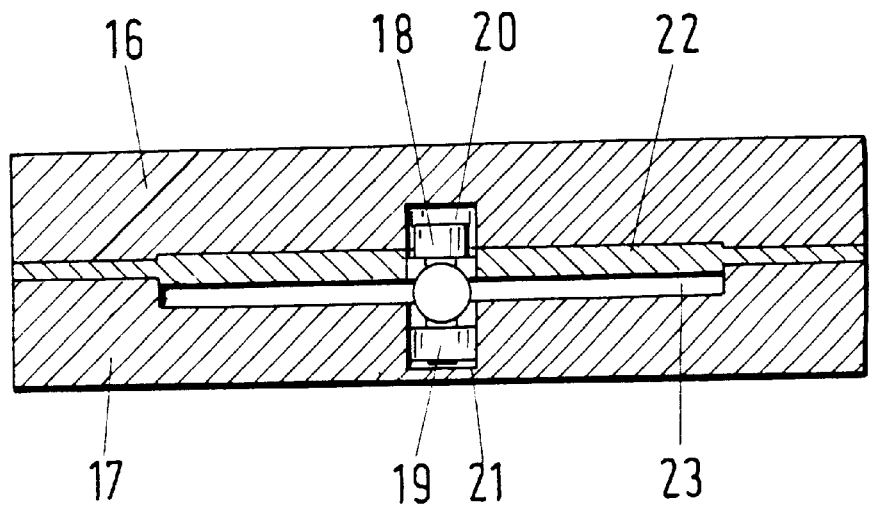
FIG. 7 is a sectional view taken along the line VII—VII in FIG. 2, on an enlarged scale.

An intermediate wall 22 is arranged between the two side wall members 16 and 17. The side wall members 16 and 17 further have recesses 23 and 24 provided on the interior surfaces thereof for receiving the shut-off elements 4 and 5, as also shown in FIGS. 1, 2, 6 and 7. Screws 25 connect the side wall members 16 and 17 as well as the intermediate wall 22 to each other (see FIGS. 3, 4 and 5). The two side wall members 16 and 17 are preferably configured as mirror images of each other, to simplify the fabrication. The device further includes edge filler strips or spacer strips 26 and 27 that are secured respectively between the side wall members 16 and 17 with the screws 25 passing therethrough as shown in FIG. 5. These strips 26 and 27 further serve to provide a lateral sliding guidance for the shut-off elements 4 and 5.

Figure 8:
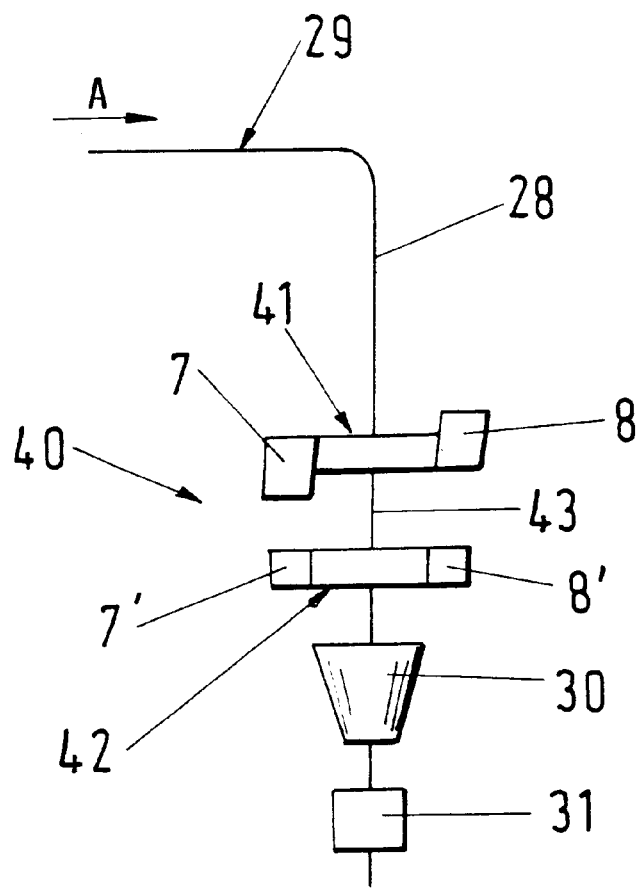
FIG. 8 is a schematic side view of a shut-off arrangement including two shut-off devices arranged in series in a pneumatic conveyor system.

FIG. 8 schematically shows a representative installation of one of the shut-off devices 1. In most application cases, the shut-off device 1 will be interposed in a vertically extending conduit section 28 of a pipeline or hoseline 29, for example directly in front of or above a collecting container 30 and/or a weighing apparatus 31. In the particular example embodiment shown in FIG. 8, a shut-off arrangement 40 is formed by a first shut-off device 41 and a second shut-off device 42 arranged in series with each other in the conveyor conduit section 28. Thus, the second shut-off device 42 is arranged after or downstream of the first shut-off device 41 in the conveying direction A of the conveyed material through the conveyor conduit line 29.

Figure 9:
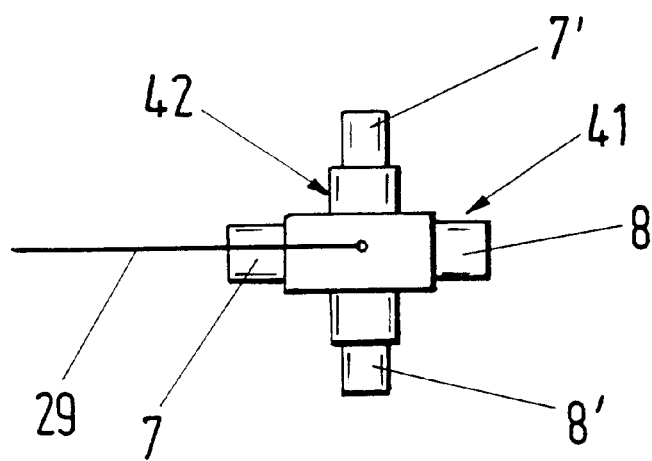
FIG. 9 is a schematic top view of a shut-off arrangement including two shut-off devices circumferentially or angularly offset by 90° from each other, arranged in a conveyor system.

It is advantageous if the spacing distance between the two shut-off devices 41 and 42, i.e. the length of the connector conduit section 43 interconnecting the two shut-off devices 41 and 42, is as small as possible. Preferably, the spacing between neighboring or adjacent shut-off elements of the two shut-off devices 41 and 42 is in the range from 20 mm to 30 mm. In order to achieve the closest or smallest possible spacing between the two shut-off devices 41 and 42, it is advantageous if the two devices are rotationally offset from each other by 90°, as shown in the top view of FIG. 9. In this manner, a collision or interference of the drives 7 and 8 of the first shut-off device 41 and the drives 7' and 8' of the second shut-off device 42 is avoided.

The two shut-off devices 41 and 42 of the shut-off arrangement 40 can each be embodied as an above described shut off device 1 that does not provide a complete closure of the flow passage 3 even in the most-closed position of the shut-off elements. However, this is not absolutely necessary. Generally, it will be sufficient and advantageous if the upstream or first shut-off device 41 is embodied as a shut-off device 1 that is not completely closed in its most-closed position, while the downstream or second shut-off device 42 is any type of shut-off device that can be completely closed. For example, the second shut-off device 42 may be configured similarly to the above described shut-off device 1, but changed so that no gap is provided between the shut-off elements, or the second shut-off device 42 can be any known shut-off device for achieving a complete sealed closure. This difference between the two shut-off devices 41 and 42 is represented by the offset or non-aligned arrangement of the two drives 7 and 8 of the first shut-off device 41, in contrast with the linear or aligned arrangement of the two drives 7' and 8' of the second shut-off device 42.

Such an arrangement of two different shut-off devices in series allows an advantageous shut-off operation of the overall shut-off arrangement. Specifically, the first shut-off device is first closed to its nearly closed condition, as described above in connection with the shut-off device 1, whereby the conveyed flow of bulk material is stopped. However, there may continue to be a slight leakage of the conveying air through the first shut-off device 41. For this reason, the second shut-off device 42 is thereafter completely closed, so as to achieve a complete air-tight sealing of the flow passage through the combined shut-off arrangement 40. Preferably, the second shut-off device 42 is only closed after any remaining conveyed material has fallen or been conveyed out of the connecting conduit section 43 between the two shut-off devices. In this manner, it can be ensured that the loose bulk material being conveyed does not jam or interfere with the complete closing of the second shut-off device 42, and thereby the second shut-off device 42 may be completely closed using a relatively low closing force, because the shut-off element of the second closing device 42 will never have to pinch-off or separate particles of the conveyed material.

The invention is not limited to the specific example embodiment concretely shown and described herein. Rather, various modifications and variations are possible within the scope of the invention. For example, the shut-off device according to the invention may include only a single shut-off element that selectively opens or nearly completely closes the flow passage, or may include two shut-off elements of which one is a stationary shut-off element. As a further alternative, two slidable shut-off elements can be arranged to slide on a common plane selectively toward and away from each other so that a gap remains between the facing free edges of the two shut-off elements in the most-closed position thereof, rather than arranging the two shut-off elements in a parallel, spaced, and overlapping fashion as described above.

The required gap between the two shut-off elements in the most-closed position, in any of the above alternative arrangements, can be achieved by configuring or dimensioning the shut-off elements so they cannot completely close, for example by dimensioning the shut-off elements smaller than the dimensions of the flow passage, or by providing holes through at least one of the shut-off elements, or by providing notches or cut-outs on the free edge of at least one of the shut-off elements. As a further alternative, the drive arrangements can be so dimensioned or limited that they cannot move the shut-off elements past a position in which the desired gap still remains. This can further be achieved by providing appropriate stop members that limit the closing travel of the shut-off elements. As can be understood, the arrangement, and/or the configuration, and/or the selected mobility of the one or two shut-off elements can be designed and embodied so as to prevent a complete closure of the flow passage by the shut-off elements even in their most-closed position.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A shut-off arrangement comprising a first shut-off device and a particulate conveyed material comprising conveyed material particles that are adapted to be conveyed in a flow of a conveying fluid selectively through said first shut-off device, said first shut-off device comprising:

a housing having a flow passage therethrough; and at least one shut-off element movably arranged in said housing so as to be selectively movable between a first maximum open position in which said at least one shut-off element leaves said flow passage substantially open to allow said particulate conveyed material to flow therethrough, and a second maximum closed position in which said at least one shut-off element mostly, but not completely, closes said flow passage while leaving an open gap therethrough, wherein said open gap is so configured and dimensioned such that said conveyed material particles become caught in said open gap or on an edge of said at least one shut-off element bounding said gap and thereby close said open gap and prevent said particulate conveyed material from further flowing therethrough when said at least one shut-off element is in said second maximum closed position.

2. The shut-off arrangement according to claim 1, wherein said at least one shut-off element is at least one of configured, dimensioned, arranged, and movable in such a manner relative to said housing so that said at least one shut-off element is positively prevented from completely closing said flow passage when said shut-off element is in said second maximum closed position.

3. The shut-off arrangement according to claim 1, wherein said at least one shut-off element comprises first and second shut-off elements that cooperate with each other to leave said flow passage substantially open when said shut-off elements are in said first maximum open position and to mostly, but not completely, close said flow passage while forming said open gap between said shut-off elements when said shut-off elements are in said second maximum closed position.

4. The shut-off arrangement according to claim 3, wherein said first and second shut-off elements are both respectively movable relative to each other and relative to said housing.

5. The shut-off arrangement according to claim 3, wherein said first and second shut-off elements are so configured and arranged so that said open gap is adapted to allow a flow of the conveying fluid therethrough between said first and second shut-off elements in said second maximum closed position.

6. The shut-off arrangement according to claim 3, wherein said first and second shut-off elements are so configured and arranged so that said first and second shut-off elements are spaced apart from each other in said second maximum closed position so as to form said open gap therebetween.

7. The shut-off device according to claim 6, wherein said first and second shut-off elements are respectively arranged on and slidably movable along two spaced-apart parallel planes.

8. The shut-off arrangement according to claim 6, wherein said first and second shut-off elements are so arranged that said shut-off elements at least partially overlap each other in an overlapping range with an open spacing therebetween forming said open gap in said overlapping range.

9. The shut-off arrangement according to claim 3, wherein each one of said shut-off elements is a respective flat plate-shaped shut-off blade.

10. The shut-off arrangement according to claim 3, wherein said open gap extends along said shut-off elements in a direction of movability of said shut-off elements.

11. The shut-off arrangement according to claim 1, wherein said open gap communicates and allows a flow of the conveying fluid therethrough and through said flow passage, wherein said open gap has a gap width in a range from ½ D to 1½ D, where D is an average particle size of said conveyed material particles.

12. The shut-off according to claim 1, wherein said open gap communicates and allows flow of the conveying fluid therethrough and through said flow passage, wherein said open gap has a flow cross-sectional area of at least 1% and not more than 7% of a nominal flow cross-sectional area of said flow passage.

13. The shut-off arrangement according to claim 1, wherein said housing comprises two plate-shaped wall members and at least two edge members that respectively have a U-shaped cross-section and that are respectively arranged with said U-shaped cross-section engaged around edges of said wall members.

14. The shut-off arrangement according to claim 1, further comprising a second shut-off device connected in series with said first shut-off device, wherein said first shut-off device is situated upstream of said second shut-off device in relation to a flow direction of the flow of the conveying fluid.

15. The shut-off arrangement according to claim 14, wherein said first and second shut-off devices are respectively different from one another.

16. The shut-off arrangement according to claim 14, further comprising a connector conduit interposed between and interconnecting said first and second shut-off devices, wherein said connector conduit extends vertically and said first shut-off device is arranged vertically above said second shut-off device.

17. The shut-off arrangement according to claim 14, wherein said first and second shut-off devices both respectively are the same as each other.

18. The shut-off arrangement according to claim 14, wherein said second shut-off device comprises a second housing having a second flow passage therethrough and at least one second shut-off element movably arranged in said second housing so as to be selectively movable between a first maximum open position in which said at least one second shut-off element leaves said second flow passage substantially open and a second completely closed position in which said at least one second shut-off element completely closes said second flow passage.

19. The shut-off arrangement according to claim 14, wherein said first and second shut-off devices are arranged and connected as close to each other as possible.

20. The shut-off arrangement according to claim 19, wherein said at least one shut-off element of said first shut-off device includes a first shut-off element and said second shut-off device includes a second shut-off element, and wherein a spacing distance between said first and second shut-off elements is in a range from 20 mm to 30 mm.

21. The shut-off arrangement according to claim 14, wherein said second shut-off device comprises a second housing with a second flow passage therethrough, and a second shut-off element slidably arranged in said second housing to selectively open or at least partially close said second flow passage, and wherein said first and second shut-off devices are arranged on a common axis, whereby said second shut-off device is rotationally offset from said first shut-off device by 90° about said common axis such that a sliding direction of said second shut-off element of said second shut-off device is 90° offset relative to a sliding direction of said at least one shut.off element of said first shut-off device.

22. A method of conveying a particulate conveyed material through a conduit with a shut-off arrangement connected thereto, wherein said shut-off arrangement includes first and second shut-off devices connected in series with each other with a connector conduit interposed therebetween, wherein said first shut-off device is arranged upstream of said second shut-off device in relation to a conveying direction, wherein said method comprises the following steps in sequence:

a) conveying said particulate conveyed material in a flow of a conveying fluid through said conduit and said first and, second shut-off devices;

b) partially closing said first shut-off device so that particles of said particulate conveyed material become caught in said first shut-off device so as to block further conveying of said particulate conveyed material while allowing at least some flow of the conveying fluid through said first shut-off device;

c) keeping said second shut-off device open for a sufficient time after said step b) so that any remaining amount of said conveyed material present in said connector conduit at the completion of said step b) flows out of said connector conduit through said second shut-off device; and d) after said remaining amount of said conveyed material has flowed out of said connector conduit through said second shut-off device, then completely closing said second shutoff device in an airtight manner.

* * * * *

UNITED STATES PATENT AND TRADEMARK OFFICE
CERTIFICATE OF CORRECTION

PATENT NO. : 6,170,521 B1
DATED : January 9, 2001
INVENTOR(S) : Rohr et al.

It is certified that error appears in the above-identified patent and that said Letters Patent is hereby corrected as shown below:

Column 1,
Line 44, after "the" replace "bulky" by -- bulk --;

Column 2,
Line 26, after "to" replace "40" by -- 10 --;

Column 4,
Line 4, replace electromechanical" by -- electro-mechanical --;

Column 7,
Line 1, after "shut-off", replace "device" by -- arrangement --;
Line 22, after "shut-off", insert -- arrangement --;
Line 23, after "allows", insert -- a --.

Signed and Sealed this

Twenty-third Day of October, 2001

*Attest:*

*Attesting Officer*

NICHOLAS P. GODICI
*Acting Director of the United States Patent and Trademark Office*